US007882257B2

(12) United States Patent
Kerr et al.

(10) Patent No.: US 7,882,257 B2
(45) Date of Patent: *Feb. 1, 2011

(54) STREAM PROCESSING NODE

(75) Inventors: Gordon Kerr, Kanata (CA); John F. Pillar, Nepean (CA); Allen W. Lengacher, Kanata (CA)

(73) Assignee: Avaya Inc. NJ (US)

( * ) Notice: Subject to any disclaimer, the term of this patent is extended or adjusted under 35 U.S.C. 154(b) by 2967 days.

This patent is subject to a terminal disclaimer.

(21) Appl. No.: 09/995,697

(22) Filed: Nov. 29, 2001

(65) Prior Publication Data

US 2002/0087709 A1 Jul. 4, 2002

Related U.S. Application Data

(60) Provisional application No. 60/287,577, filed on Dec. 29, 2000, provisional application No. 60/283,919, filed on Dec. 29, 2000.

(51) Int. Cl.
*G06F 15/16* (2006.01)
(52) U.S. Cl. ................................ 709/231; 709/230
(58) Field of Classification Search ......... 709/230–231, 709/232, 213, 250, 201
See application file for complete search history.

(56) References Cited

U.S. PATENT DOCUMENTS 5,303,302 A * 4/1994 Burrows .................... 713/161

| | | | | |
|---|---|---|---|---|
| 5,933,603 A | * | 8/1999 | Vahalia et al. | 709/225 |
| 6,606,666 B1 | * | 8/2003 | Bell, Jr. et al. | 709/232 |
| 6,744,776 B1 | * | 6/2004 | Kalkunte et al. | 370/412 |
| 6,744,815 B1 | * | 6/2004 | Sackstein et al. | 375/240 |
| 6,804,698 B1 | * | 10/2004 | Richards et al. | 718/104 |

OTHER PUBLICATIONS http://searchstorage.techtarget.com/sDefinition/0,,sid5_gci214147,00.html, "definition of switching fabric", May 7, 2001.*

* cited by examiner

*Primary Examiner*—Hussein A Elchanti
(74) *Attorney, Agent, or Firm*—Leslie A. Kinsman; Borden Ladner Gervais LLP

(57) ABSTRACT

In a stream processing node, a producer of properly ordered portions of a data stream, hereinafter referred to as substreams, is coupled to a stream fabric that is further coupled to a series of potential consumers for the data stream, one of the potential consumers being a content processing element. The producer outputs the substreams to a stream queue that is associated with the data stream within the stream fabric. Subsequently, a portion of the data within the stream queue is copied and analyzed by the content processing element which determines what further actions are to be taken with respect to the data within the particular stream queue. These actions could include copying a further portion of the data within the stream queue to the content processing element for further analysis; redirecting the data within the stream queue to another consumer of the data stream, such as another processing element or an interface with a packet switched network; modifying a portion of the data within the stream queue; and/or transferring a portion of the data within the stream queue to another stream queue.

33 Claims, 13 Drawing Sheets

STREAM PROCESSING NODE

This application claims priority to U.S. Patent Application 60/287,577 filed Dec. 29, 2000 and U.S. Patent Application 60/283,919 filed Dec. 29, 2000.

FIELD OF THE INVENTION

The present invention relates generally to stream data and, more specifically, to apparatus and method for processing stream data within a node.

BACKGROUND OF THE INVENTION

A packet switched network is one in which data is communicated as discrete packets, each packet containing a header. The header contains information regarding the packet's source, ultimate destination, etc. For instance, in the case of a Transmission Control Protocol (TCP)/Internet Protocol (IP) packet, the header includes the IP source address, TCP source port, the IP destination address and the TCP destination port. Each packet is individually transmitted to its ultimate destination through a series of network switches (bridges, IP switches, IP routers, layer 4 load balancers, etc.). Most network switches examine the header to determine the packet's ultimate destination, and the network switch decides how to forward the packet based on this header information. A network switch that operates in this manner remains "ignorant" of the packet content since the actual content of the packet is irrelevant in making forwarding decisions.

Recently, network switches (e.g. bridges, IP switches, IP routers, layer 4 load balancers, etc.) have emerged, which are "content aware". These types of switches are often referred to as "content switches". Content switches are embedded with specific knowledge of, and monitor or participate in, the upper layer protocols (e.g., HTTP etc.). Content switches examine and sometimes modify the packets of data transmitted through the network. These content switches are typically designed around a packet-oriented switch fabric similar to the way bridges, IP routers and layer 4 load balancers are designed. In some instances, content switches may also perform bridging, routing and load balancing functions.

Conventional content switches have been made content aware only for applications that are popular and that will benefit from content aware switching or processing. These applications have been and likely will continue to be stream-oriented applications. A stream is a series of bytes transferred from one application to another and stream-oriented applications create or manipulate data as streams of bytes. In the case of a stream being transmitted within a packet switched network, the stream of data is divided and transmitted via a flow of packets, a flow of packets being a bidirectional set of packets going between two end points within two end stations. At the application end points, streams of bytes are passed through layer 4 processing, such as a TCP layer. On behalf of the sending application, the layer 4 processing divides the data stream arbitrarily into segments, applies a segment header to identify the stream and the relative order of the data, and applies a layer 3 header such as an IP header. On behalf of the receiving application, the layer 4 processing re-orders misordered segments, requests retransmission of lost packets and reconstitutes the byte stream. It is noted that it is possible for packet switched networks to mis-order and/or lose packets.

One problem with the current design of content switches is that as content switching and content modification become more sophisticated, the ability to perform functions on a packet by packet basis will become awkward, inefficient and virtually impossible. Thus, there will be the need for the content switch to reconstitute the original data stream and re-segment it, this functionality being referred to as a layer 4 proxy function (for example a TCP proxy function).

As content functions become more sophisticated and processing intensive, a content switch will need to distribute the processing among processing elements within the switch to become faster and more efficient. These processing elements may be identical and simply load share the work or they may be optimized for certain applications or portions of applications. Connecting these processing elements with a packet fabric will require that the layer 4 proxy function be performed by or next to each processing element.

The location of the layer 4 proxy function next to each processing element, however, is less than optimal because some applications may only determine the most appropriate processing entity by examining the content and because some applications may require multiple processing elements to perform content functions on a data stream in series. In these cases, the proxy function would be done more times than necessary and the stream would be transmitted more times than necessary.

It would thus be beneficial to provide a fabric, which would manage/switch data streams, allowing the layer 4 proxy function to be more appropriately placed and performed less often.

SUMMARY OF THE INVENTION

The present invention is directed to apparatus and method for processing data streams within a node. In embodiments of the stream processing node according to the present invention, a producer of properly ordered portions of a data stream, hereinafter referred to as substreams, is coupled to a stream fabric that is further coupled to a series of potential consumers for the data stream, one of the potential consumers being a content processing element. The producer outputs the substreams to a stream queue that is associated with the data stream within the stream fabric. Subsequently, a portion of the data within the stream queue is copied and analysed by the content processing element which determines what further actions are to be taken with respect to the data within the particular stream queue. These actions could include copying a further portion of the data within the stream queue to the content processing element for further analysis; redirecting the data within the stream queue to another consumer of the data stream, such as another processing element or an interface with a packet switched network; modifying a portion of the data within the stream queue; and/or transferring a portion of the data within the stream queue to another stream queue. In one particular embodiment, the producer is an Input/Output (I/O) element coupled to a packet switched network that receives a flow of data packets and outputs substreams to the stream queue that correspond to a data stream within the flow of data packets. In this embodiment, the content processing element, after analysing a portion of the data within the stream queue, determines to output the data stream to a particular flow of packets within the packet switched network. In this embodiment, the stream processing node essentially operates as a stream content switch.

According to a first broad aspect, the present invention is an apparatus for processing data streams including a producer of properly ordered substreams of a data stream, a series of potential consumers of a data stream and a stream fabric that is coupled to the producer and the potential consumers. In this aspect, the stream fabric operates to receive the substreams from the producer, store the substreams within a stream queue associated with the data stream and output at least a portion of the data within the stream queue to a consumer of the stream queue, the consumer being one of the plurality of potential consumers. In some embodiments of this first broad aspect of the present invention, the producer is an Input/Output (I/O) element arranged to be coupled to a packet switched network and the consumer of the stream queue is a processing element such as a content processing element.

In a second broad aspect, the present invention is an apparatus for processing streams of data including a producer of properly ordered substreams of a data stream, a content processing element and a stream fabric coupled to the producer and the content processing element. In this aspect, the stream fabric operates to receive the substreams from the producer, store the substreams within a stream queue associated with the data stream and copy a portion of the data within the stream queue to the content processing element. Further, the content processing element operates to receive the data output from the stream queue, process contents of the data received from the stream queue and transmit a control signal to the stream fabric in response to the processing of the contents of the data. In some embodiments of this second broad aspect, the apparatus further includes a consumer of a data stream and the control signal includes an instruction for the stream fabric to forward further data from the stream queue to the consumer.

According to a third broad aspect, the present invention is an apparatus for processing data streams including production means for producing properly ordered substreams of a data stream, a series of consumption means for consuming a data stream, storage means for storing the substreams and output means for outputting at least a portion of the data within the storage means to one of the consumption means.

According to a fourth broad aspect, the present invention is a method of processing a data stream. The method includes producing properly ordered substreams of a data stream; storing the substreams within a stream queue associated with the data stream; and outputting at least a portion of the data within the stream queue to a consumer of the stream queue, the consumer being one of a plurality of potential consumers.

According to a fifth broad aspect, the present invention is a method of processing a data stream. The method includes producing properly ordered substreams of a data stream; storing the substreams within a stream queue associated with the data stream; processing contents within at least a portion of the data within the stream queue to determine one of a plurality of potential consumers to select as a consumer of the stream queue; and outputting at least a portion of the data within the stream queue to the selected consumer of the stream queue.

Other aspects and advantageous features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood by reference to the following detailed description of an exemplary embodiment in conjunction with the accompanying drawings, in which.

DETAILED DESCRIPTION OF THE INVENTION

The present invention provides a method and apparatus for content based decision making for forwarding/processing data streams. Within embodiments of the present invention, properly ordered portions of data streams, hereinafter referred to as substreams, are input to stream queues within a stream fabric; stream queues being data structures that store continuous subsets of data streams while they await processing or transmitting. Each stream queue has an assigned producer and an assigned consumer, each of which have set controls over the stream queue. For instance, in one embodiment, the producer of the stream queue can push substreams and/or control information onto the stream queue while the consumer of the stream queue can request to pop portions of the data from the stream queue to the consumer, to copy portions of the data from the stream queue to the consumer, to transfer portions of data from the stream queue to another stream queue, and to push data and/or control information onto the stream queue. Further, the consumer can request the stream fabric to adjust the consumer attributes such as to change the consumer that is to control the stream queue and/or change the number of bytes transferred to the consumer during a pop/copy. The changing of the actual consumer is hereinafter referred to as rescheduling of the stream queue.

Figure 1:
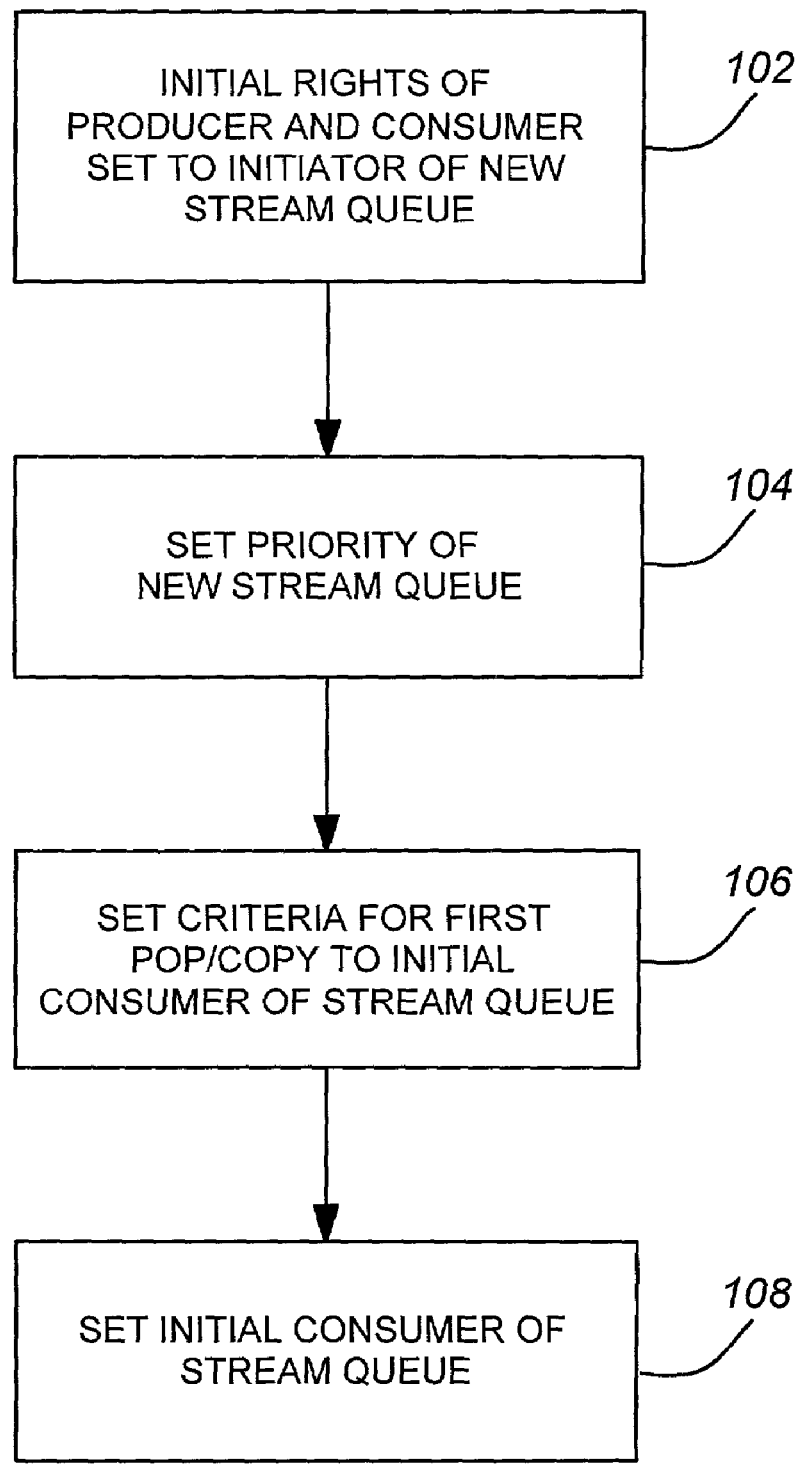
FIG. 1 illustrates a flow chart of a set of steps performed by an initiator of a new stream queue according to the present invention.

FIG. 1 illustrates a flow chart of a set of steps performed by an initiator of a new stream queue according to an embodiment of the present invention. A new stream queue might need to be initiated in the case that a new stream of data enters the stream fabric, such as a new stream from a packet switched network. In one embodiment, the initial rights of the producer and consumer are set to the initiator of the new stream queue as depicted in step 102. Next, the initiator of the new stream queue sets the priority of the stream queue relative to other stream queues within the stream fabric at step 104 and sets the criteria for the first pop/copy of data from the stream queue at step 106. Finally, at step 108, the initiator of the stream queue sets the initial consumer of the stream queue at step 106 by requesting a change in the consumer attributes for the stream queue, thus rescheduling the stream queue. This first rescheduling of the stream queue in many embodiments is done to direct the first copy of the data within the stream queue to a default processor that will always receive the right to consume the stream, such as a content processing element. In other embodiments, the initial consumer of the stream queue could be determined on a round robin basis, or on some other basis. Further, the initial consumer could be a set of possible consumers wherein the least burdened of the set, or the consumer in the set with the highest priority receives the initial right to consume the stream queue. Those skilled in the art will recognize that there are many variations for determining the initial consumer of the stream queue and that each of these variations will fall within the scope of the invention. It should further be understood that the above steps for initiating a stream queue could be performed in a different order.

Figure 2:
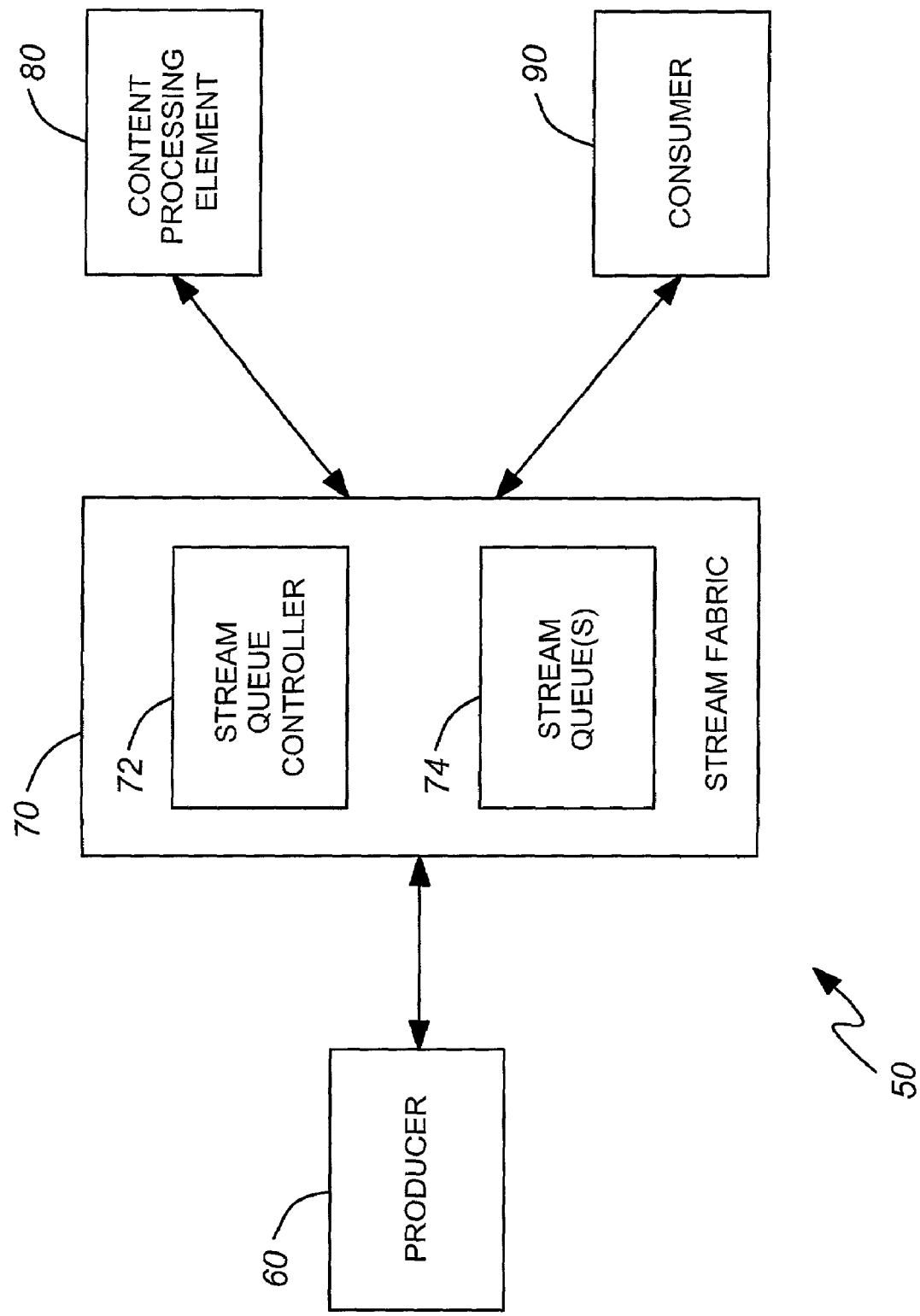
FIG. 2 illustrates a simplified block diagram of a stream processing node according to an embodiment of the present invention.

FIG. 2 illustrates a simplified block diagram of a stream processing node according to an embodiment of the present invention. As depicted, stream processing node 50 comprises a producer of a stream of data 60 (hereinafter referred to as a producer), a content processing element 80, a consumer of a stream of data 90 (hereinafter referred to as a consumer) and a stream fabric 70 coupled between the other elements 60,80,90. Each of the producer and consumer 60,90 could be an Input/Output (I/O) element, a processing element, a computer, a memory device, a storage device, a cache device or another device that can produce and/or consume a data stream.

The stream fabric 70, as depicted in FIG. 1, comprises a stream queue controller 72 and a set of stream queue(s) 74; the stream queue(s) 74, as described above, being data structures that store continuous subsets of data streams while they await processing or transmitting. The stream queue(s) 74 may be one or more buffers, registers and/or any other type of temporary storage devices. The stream queue(s) 74 may be hierarchical. The stream queue controller 72 controls the stream queue(s) 74 as will be described in detail herein below. Although only one stream queue controller 72 is illustrated for ease of explanation, it should be recognized that more than one could be implemented within the stream fabric 70. The stream queue controller 72 may be an application specific integrated circuit (ASIC), a reduced instruction set computer (RISC) processor, a complex instruction set computer (CISC) processor, a digital signal processor (DSP) or another processing element.

Although component 60 is labelled as a producer of a stream of data and component 90 is labelled as a consumer of a stream of data, it should be understood that the producer 60 could also operate as a consumer of a stream of data and the consumer 90 could operate as a producer of a stream of data. This is illustrated in detailed examples described herein below in which producer 60 is an Input/Output (I/O) element and the consumer 90 is a processing element. Further, it should be understood that the content processing element could be considered an initial consumer of streams of data. Yet further, although only a single producer 60, a single consumer 90 and a single content processing element 80 is shown, a plurality of one or more of these elements could be implemented in a stream processing node according to the present invention.

Figure 3:
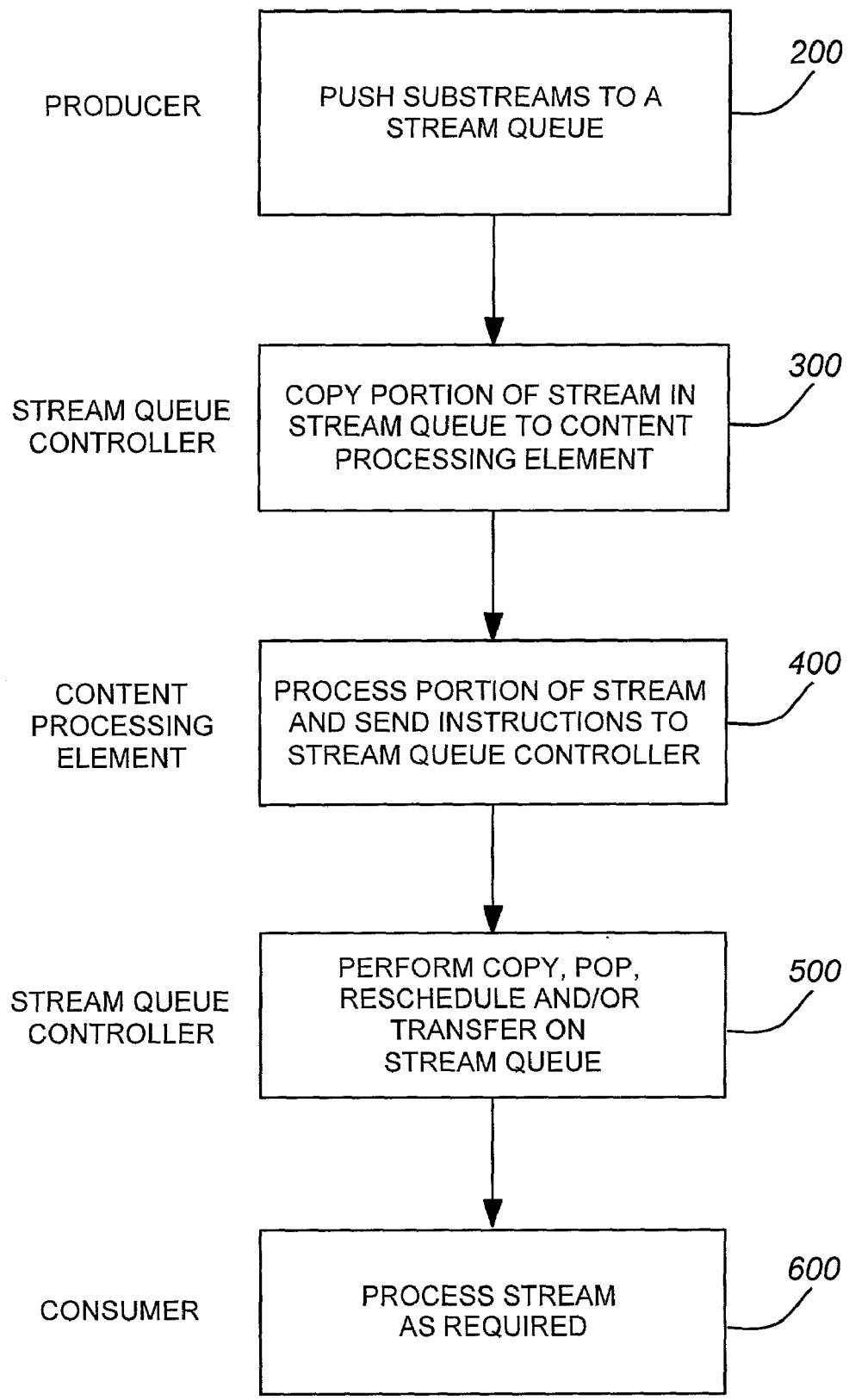
FIG. 3 illustrates a flow chart of a set of broad steps performed within a stream processing node according to an embodiment of the present invention.

FIG. 3 illustrates a flow chart of the broad steps performed within the stream processing node 50 according to an embodiment of the present invention. Firstly, at step 200, the producer 60 pushes properly ordered portions of a stream of data (substreams) to a stream queue 74 within the stream fabric 70. The producer 60 could have acquired the stream of data from many different sources including an internal memory source, an internal processing element and/or an external component or network. For instance, in the case that the producer is an I/O element, the producer 60 might have received a stream of data (voice, data, video, etc.) segmented within a series of data packets from a packet switched network. In this case, the producer 60 would classify the received packets into separate streams, reconstitute substreams of the data within the packets and push the reconstituted substreams to a stream queue 74 within the stream fabric 70.

Next, as depicted at step 300 of FIG. 3, a copy of the leading portion of the data within the stream queue 74 is forwarded to the content processing element 80. This is followed at step 400 by the content processing element 80 processing the content in the leading portion of the data within the stream queue and, based upon this content, deciding what to do with the particular stream. For instance, as described below in more detail, the content processing element 80 could decide to: consume the stream (i.e. pop and process all data received at the stream queue), consume a portion of the stream (i.e. pop and process a portion of the data received at the stream queue), add data to the stream (i.e. push data to the stream queue), delete data from the stream (i.e. simply pop data from the stream queue and disregard it), change data in the stream (i.e. pop data from the stream queue and push modified data back onto the stream queue), redirect the right to consume the stream to another potential consumer (i.e. change the consumer attributes for the stream queue), request more data from the stream queue 74 (i.e. copy a further portion of the data from the stream queue), transfer data from the stream queue 74 to another stream queue (i.e. pop a portion of the data on the stream fabric and push this data onto another stream queue) etc. The content processing element 80 then sends instructions to the stream queue controller 72 indicating the decision that was made. For instance, if the content processing element 80 decides to consume the stream then it instructs the stream queue controller 72 to push portions of the data in the stream queue 74 to that processing element. If the content processing element 80 decides to reroute the stream, it instructs the stream queue controller 72 which consumer should have the right to consume the data within the particular stream queue 74.

Subsequently, as depicted at step 500, the stream queue controller 72 performs the copy, pop, push, reschedule and/or transfer operation on the stream queue 74 as requested, each of these functions described by example in more detail herein below. Finally, if the stream queue controller 72 reschedules the stream queue to another consumer, such as the consumer 90 of FIG. 1, or essentially continues to assign itself as the consumer by selecting to pop data from the stream queue, the data within the stream queue is processed by the consumer as required at step 600. At this point, the results from the processing of the data stream may be output from the stream processing node, saved within the stream processing node or output back within a second stream queue within the stream fabric 70. In this last case, the consumer is essentially the producer of the second stream queue and possibly the initiator of this second stream queue.

Figure 4:
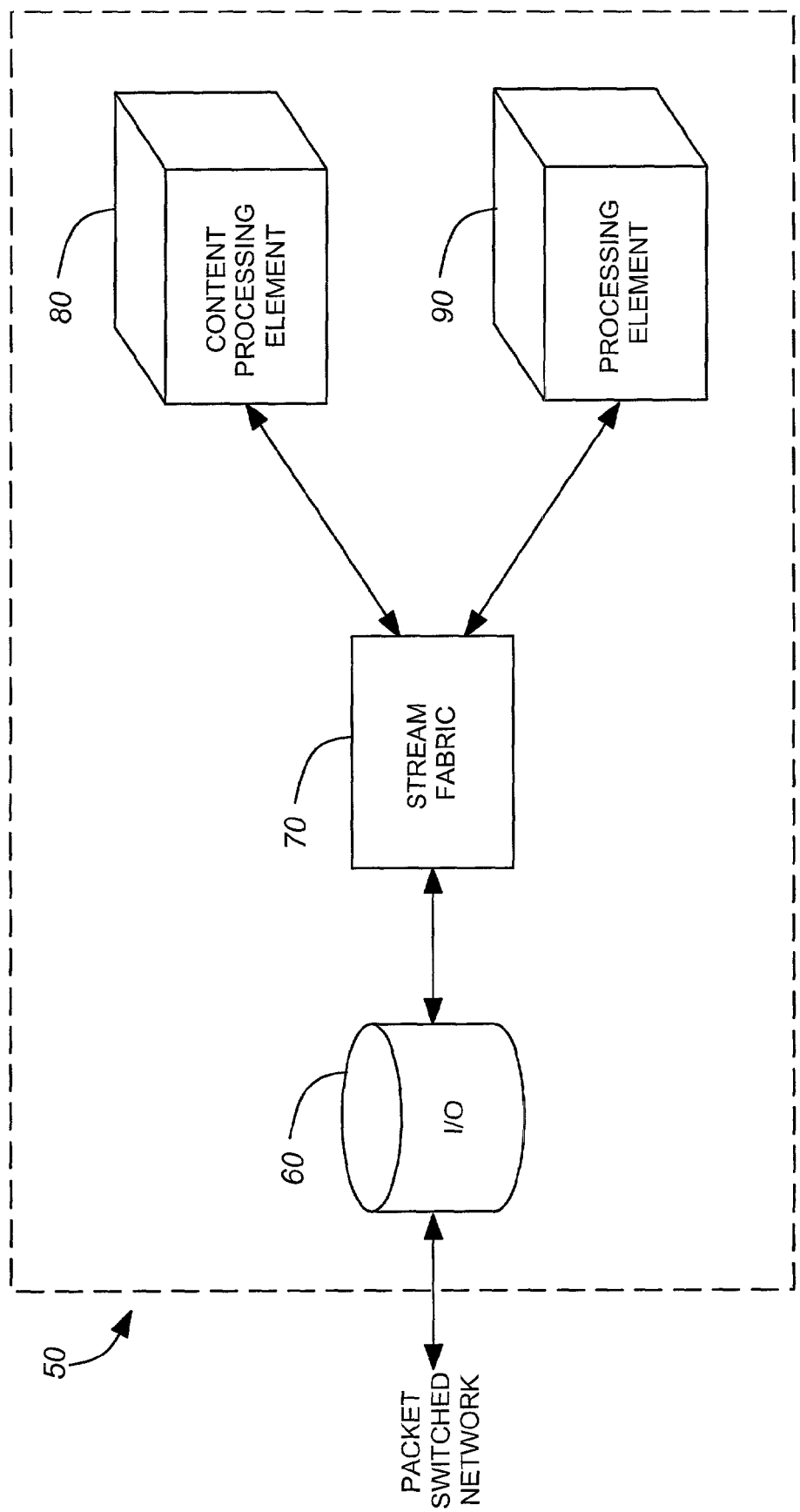
FIG. 4 illustrates a simplified block diagram of a stream processing node with an I/O element coupled to a packet switched network according to an embodiment of the present invention.

FIG. 4 illustrates a simplified block diagram of a stream processing node with an I/O element coupled to a packet switched network according to an embodiment of the present invention. In this embodiment, the producer 60 of FIG. 2 is an I/O element which receives data packet flows from a packet switched network and outputs properly ordered substreams of the data streams to respective stream queues within the stream fabric 70. The processing element 90 could be utilized as a consumer of the data streams if it is deemed necessary to perform processing on any of the data within the stream queues of the stream fabric 70. Further, as will be described herein below in detail, the I/O element 60 could be utilized as a consumer of data streams if any of the data streams must be routed back onto the packet switched network and the processing elements 80,90 could be utilized as producers of data streams if, after processing a data stream or a portion of a data stream, substreams of a new or modified data stream are output to a new stream queue within the stream fabric 70.

It should be understood that, although FIG. 4 shows only one I/O element 60, one content processing element 80 and one processing element 90, it should be understood that there may be any number of I/O elements, content processing elements, processing elements and/or other producer and consumer components within the stream processing node.

Figure 5:
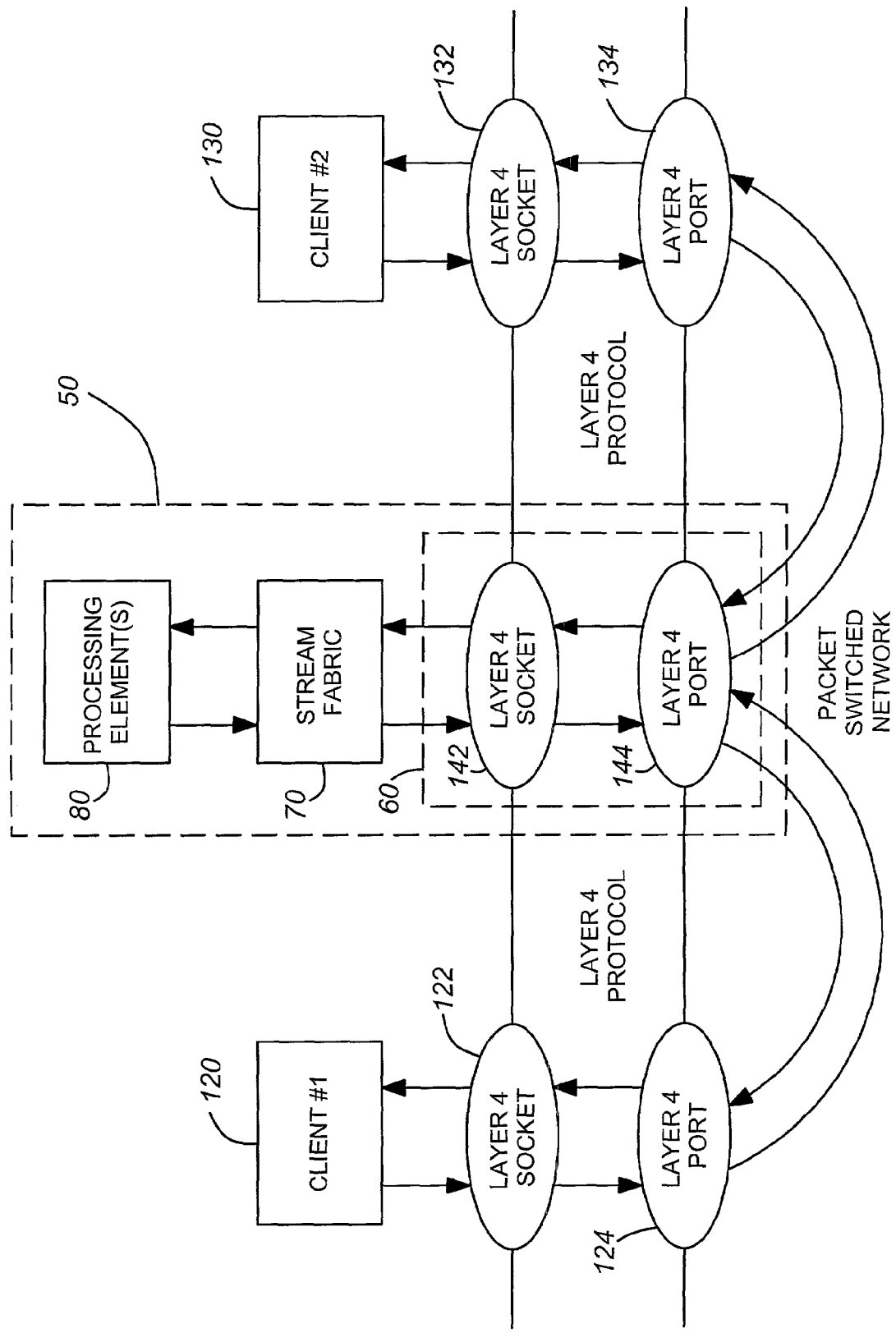
FIG. 5 illustrates a logical block diagram of a sample implementation of the stream processing node of FIG. 4 in a packet switched network.

FIG. 5 illustrates a logical block diagram of a sample implementation of the stream processing node 50 of FIG. 4 in a packet switched network. As depicted, a first client 120 is communicating with a second client 130 via the stream processing node 50 utilizing a layer 4 protocol such as TCP. In this case, the first client 120 is coupled to the packet switched network via a layer 4 socket 122 and a layer 4 port 124 and the second client 130 is coupled to the packet switched network via a layer 4 socket 132 and a layer 4 port 134. The I/O element 60 within the stream processing node 50, as depicted in FIG. 4, is logically comprised of a layer 4 socket 142 coupled to the stream fabric 70 and a layer 4 port 144 coupled between the layer 4 socket 142 and the packet switched network.

In this case, a stream of data output from the first client 120 is segmented by the layer 4 socket 122 and the segments of the stream are output as data packets with layer 3 and layer 4 headers (such as TCP and IP headers) from the layer 4 port 124. The layer 4 port 144 along with the layer 4 socket 142 operate to receive the data packets transmitted from the layer 4 port 124 and reconstitute the data stream output from the first client 120. The reconstitution of the data stream is done with well-known layer 4 protocol techniques including removing the packet overheads from the packets, re-ordering the data within the packets into the correct order and requesting the retransmission of any packets that were lost. The layer 4 socket 142 then forwards substreams of the data stream to the stream fabric 70. In the case that the stream processing node 50 determines that the data stream is to be forwarded to the second client (possibly due to an HTTP address within the content of the data stream), the stream fabric 70 outputs portions of the stream to the layer 4 socket 142 which along with the layer 4 port 144, segments the stream data and outputs packets including the segmented data and layer 3 and layer 4 headers to the layer 4 port 134. Similar to the above described operation for the layer 4 port 144 and layer 4 socket 142, the layer 4 port 134 and layer 4 socket 132 proceed to receive the packets of the data stream, reconstitute the data stream and output the data stream to the second client 130.

It should be recognized that although the above description is specific to communications from the first client 120 to the second client 130, communications could further be directed in the opposite direction or other clients could be included within the system. Further, it should be understood that the bidirectional communications between the layer 4 ports 124, 144 could be considered a flow of packets while the bidirectional communications between the layer 4 ports 144,134 could further be considered a flow of packets.

Figure 6:
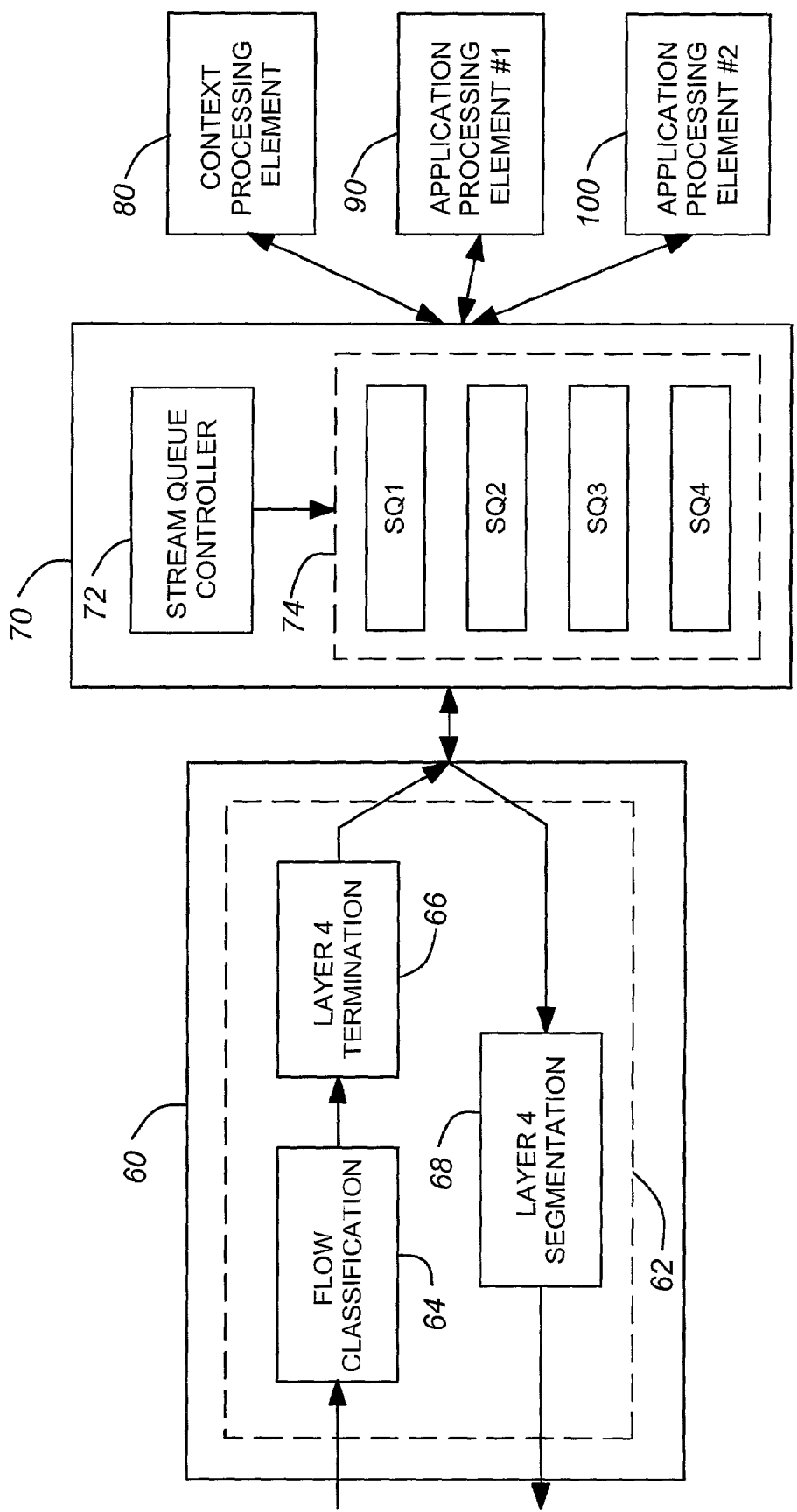
FIG. 6 illustrates a detailed block diagram of the stream processing node of FIG. 4 according to an embodiment of the present invention.

FIG. 6 illustrates a detailed block diagram of the stream processing node 50 of FIG. 4 according to an embodiment of the present invention. This implementation of the stream processing node 50 could be utilized within the example described above with reference to FIG. 5. As depicted, the stream processing node of FIG. 6 comprises I/O element 60, stream fabric 70, content processing element 80 and processing elements 90,100 which correspond to first and second application processing elements respectively. It should be understood that other I/O elements and/or processing elements could also be included within the stream processing node 50 of FIG. 6. Further, although the stream fabric 70 is depicted with four stream queues 74, other numbers of stream queues could be implemented.

As illustrated in FIG. 6, the I/O element 60 comprises a processor 62 that includes a flow classification block 64, a layer 4 termination block 66 and a layer 4 segmentation block 68 which together are logically equivalent to the layer 4 port 144 and layer 4 socket 142 of FIG. 5. The flow classification block 62 classifies packets received from a packet switched network into separate flows of packets based upon the flow identifiers attached to the packets, the flow identifiers including the source layer 3 address, the source layer 4 port, the destination layer 3 address, the destination layer 4 port and the layer 4 identifier (i.e. UDP or TCP etc.). Each flow of packets corresponds to a different stream of data. The layer 4 termination block 66 performs well-known reconstituting of the data stream by removing the packet overhead from the data, re-ordering the data within the received packets and requesting re-transmissions of packets that have been lost. The output from the layer 4 termination block 66 are substreams including correctly ordered portions of the overall data stream. The layer 4 segmentation block 68 performs well-known segmentation operations of incoming data from the stream fabric 70 and outputs packets including the segmented data along with layer 3 and layer 4 headers to a packet switched network.

Figure 7:
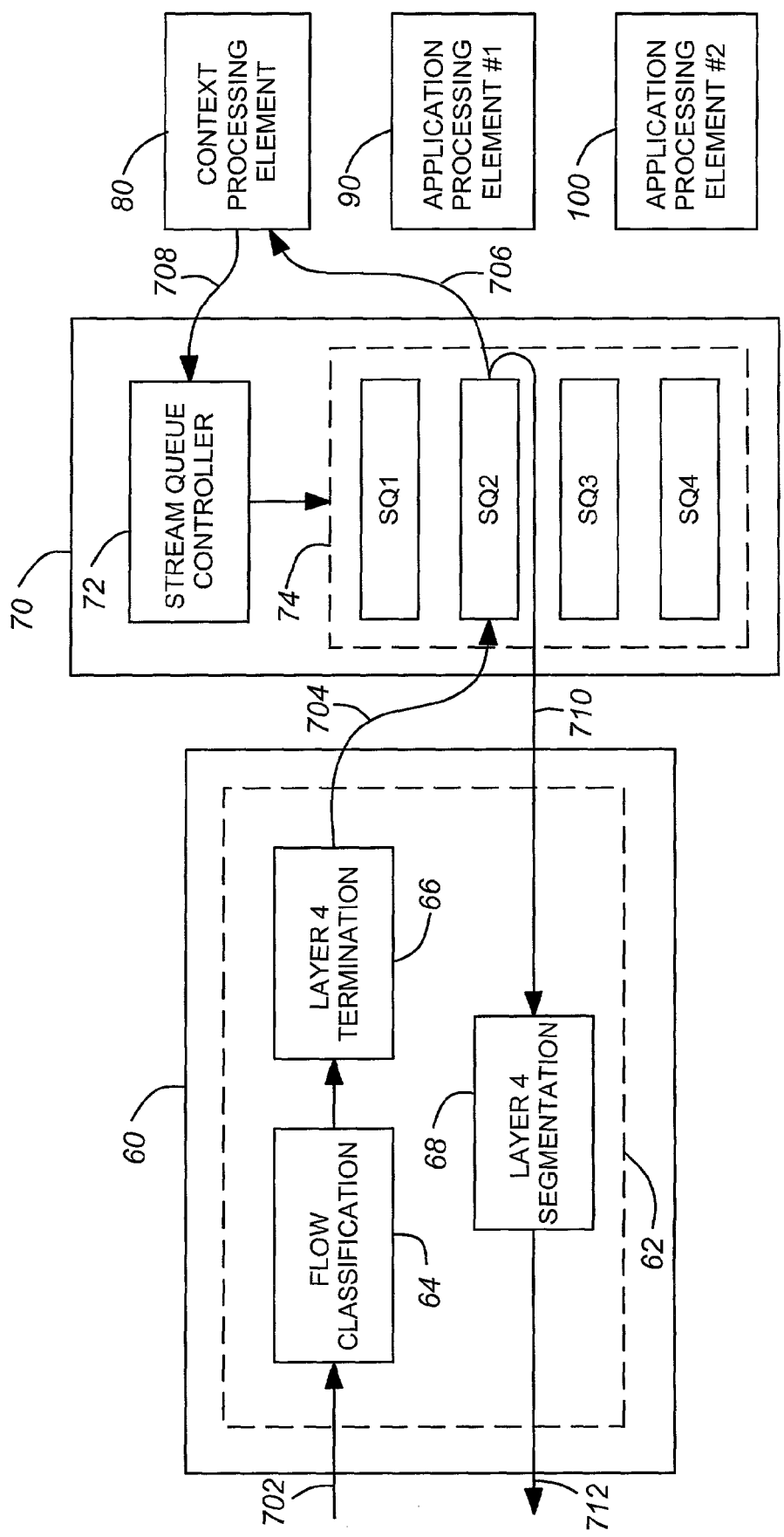
FIG. 7 illustrates the block diagram of FIG. 6 with the signalling depicted for one particular sample operation.

The operation of the stream processing node 50 of FIG. 6 will now be described for one particular scenario with reference to FIGS. 7 through 10. In this scenario, a data stream arrives at the I/O element 60 and has an indication within its content of where the data stream should be ultimately forwarded. For example, the content could include an HTTP address that indicates the appropriate location for the stream processing node to route the particular data stream. FIG. 7 illustrates the block diagram of FIG. 6 with the signalling depicted for this scenario.

As illustrated in FIG. 7, a flow of data packets, as indicated by signal 702, is received at the I/O element 60 and a series of substreams of the data stream contained within the received data packets is subsequently output to a stream queue (in this case SQ2) within the stream fabric 70 as indicated by signal 704. In this case, the I/O element 60 is the producer of the stream queue SQ2.

Figure 8:
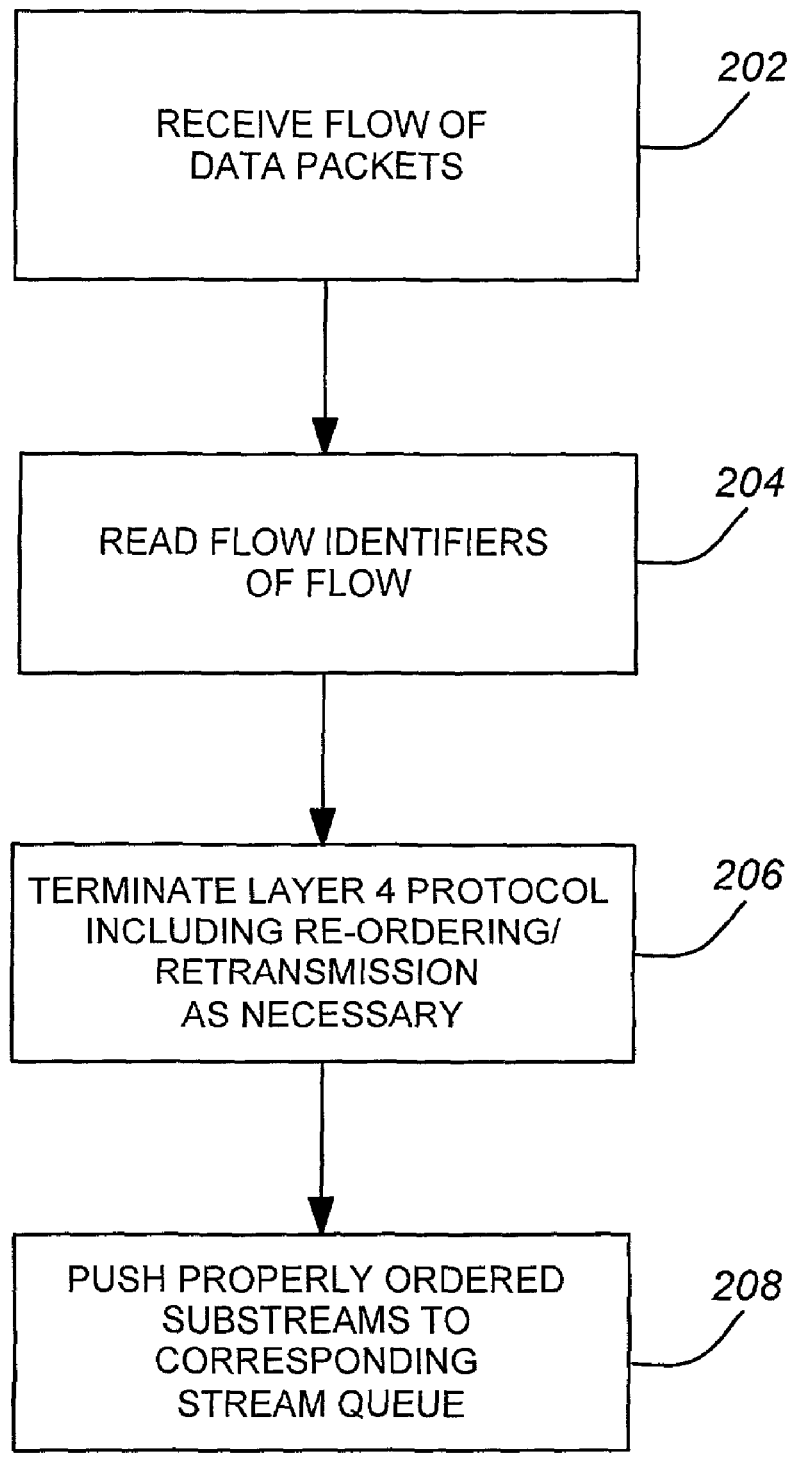
FIG. 8 illustrates a flow chart of a set of steps performed by an Input/Output (I/O) element as a producer for a stream queue according to an embodiment of the present invention.

FIG. 8 illustrates a flow chart of a set of steps performed by an I/O element as a producer for a stream queue according to an embodiment of the present invention. Firstly, the I/O element receives a flow of data packets at step 202. These packets may represent a single segmented data stream from a single sender, many segmented data streams from many senders, or many segmented data streams from a single sender. For example, an I/O element may receive 100 IP packets which represent a single data stream made up of 100 packets, or multiple data streams each made up of fewer than 100 packets.

Next, at step 204, the I/O element reads the flow identifiers of the packets within the flow at step 204. As described above, the flow identifiers include the packets' source layer 3 address, source layer 4 port, destination layer 3 address, destination layer 4 port and a layer 4 identifier (i.e. UDP or TCP etc.). Each flow identifier is unique to a particular data stream. Therefore, the I/O element can group the received data packets based upon the data stream which they are associated with by grouping the packets with identical flow identifiers.

Next, the I/O element terminates the layer 4 protocol for the packets using well-known techniques at step 206. This termination of the layer 4 protocol includes removing packet overhead such as the layer 3 and layer 4 headers from the data, re-ordering the data into the proper order as necessary and requesting retransmission of any packets that are found to be lost or delayed beyond a threshold level. The result of the termination of the layer 4 protocol is the reconstitution of data streams or at least portions of the data streams within the I/O element.

Finally, at step 208, the I/O element pushes properly ordered substreams of data bytes to corresponding stream queues. If no stream queue has yet been assigned for a particular received stream, the I/O element preferably goes through an initiation procedure such as that described above with reference to FIG. 1.

Now returning to FIG. 7, the substreams 704 output from the I/O element 60 are received at a stream queue 74 (SQ2 in FIG. 7). Once the data stream is at least partially received by the stream queue 74, a copy of a portion of the data within the stream queue is forwarded to the initial consumer of the stream queue as indicated by the signal 706, the initial consumer being the content processing element 80 in the scenario of FIG. 7. The stream queue controller 72 then waits for instructions from the content processing element 80.

Figure 9:
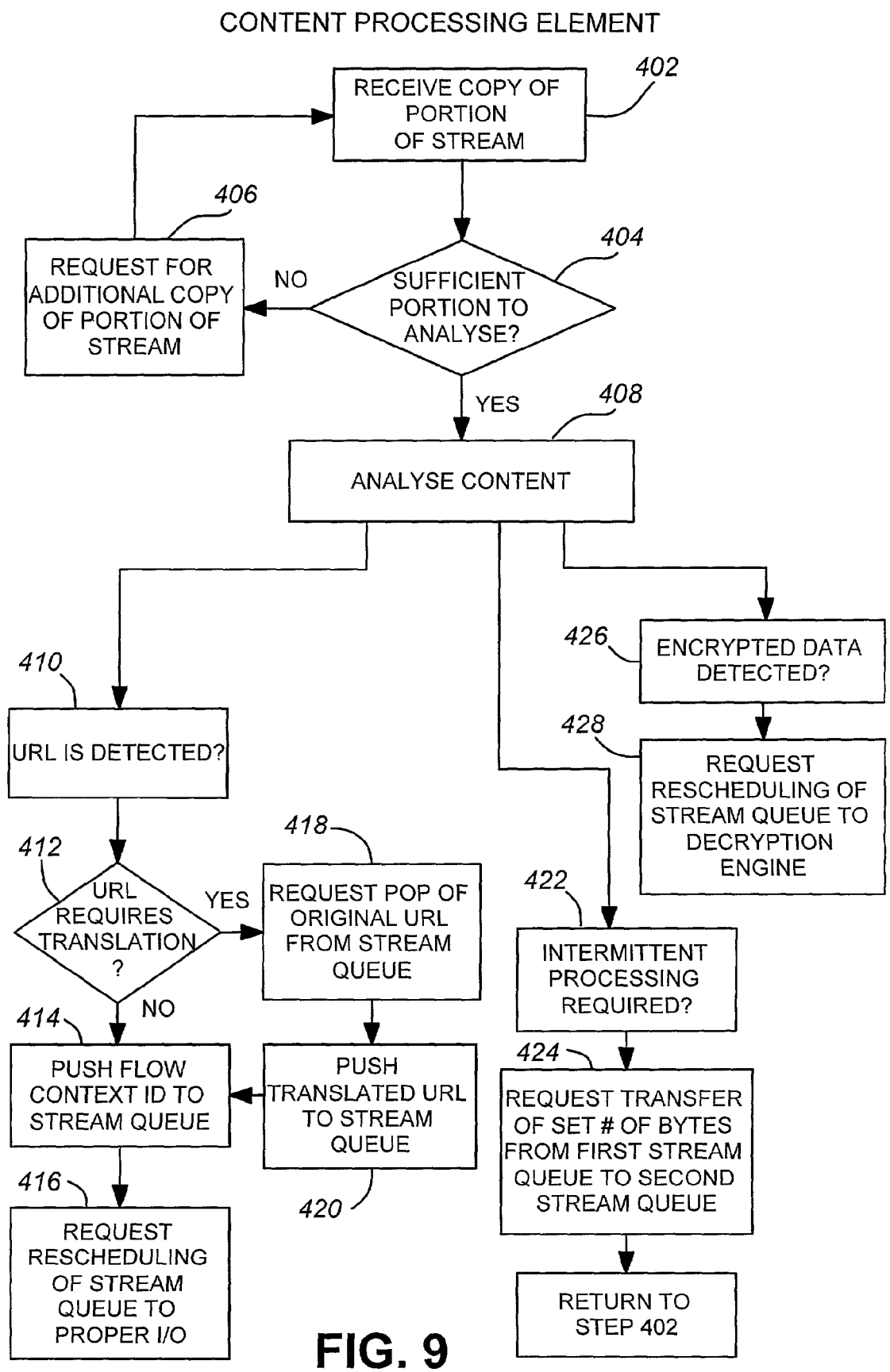
FIG. 9 illustrates a flow chart of a set of steps performed by a content processing element within a stream processing node according to an embodiment of the present invention.

FIG. 9 illustrates a flow chart of a set of steps performed by a content processing element within a stream processing node according to an embodiment of the present invention. Firstly, the content processing element receives a portion of a data stream at step 402. Next, it determines if the portion is sufficient to analyse the stream at step 404. It might not be a sufficient portion of the stream in many instances such as in the case that the content processing element has not yet received a complete HTTP address to indicate proper routing of the data stream. If there is not a sufficient portion of the data stream to analyse, the content processing element requests, at step 406, for an additional copy operation to be performed such that an additional portion of the data within the stream queue is copied to the content processing element. Next, the content processing element processes the content within the data that it has received at step 408. Three possible conclusions of many from the analysis could be that a URL is detected as depicted at step 410, an intermittent processing is determined to be required at step 422 and encrypted data is detected at step 426.

If a URL is detected at step 410, the content processing element determines if a URL translation is required at step 412. In some embodiments of the present invention, the content processing element includes a URL translation table. If a URL is detected that is included within the table, a translation of the URL is required. One skilled in the art could conceive of other cases in which a translation in the URL would be required as well.

If no translation is required, the content processing element pushes a flow context ID to the stream queue at step 414. The flow context ID is a number that indicates to an I/O element that later processes the data stream which flow within the packet switched network to output the data stream. In the case that no previous data stream has been assigned the particular flow that the content processing element determines is necessary to properly route the data stream, the content processing element preferably pushes a flow context ID that includes the required layer 3 destination address and the layer 4 destination port for the data stream. With this information, an I/O element can produce a flow identifier for the packets of that required flow which can preferably later be accessed with use of an assigned flow context ID number. Finally, after pushing the flow context ID to the stream queue, the content processing element, at step 416, requests rescheduling of the stream queue to the proper I/O element.

If at step 412 it is determined that the URL requires a translation, the content processing element requests a pop of the original URL data from the stream queue at step 418. Once the content processing element receives the pop of the original URL, the content processing element pushes, at step 420, the translated URL to the stream queue to replace the original URL. Once completed, the content processing element continues to proceed with the steps 414 and 416 described herein above.

If an intermittent processing is required as detected at step 422, the content processing element requests a transfer of a set number of bytes from the first stream queue to a second stream queue at step 424. This intermittent processing could be required in cases that the content processing element can determine how to properly proceed with only a portion of the data stream or if the content processing element determines that a change within the data stream is required intermittently. This could occur for example in cases that a URL must be translated periodically during a single data stream. Once, the set number of bytes are transferred, the content processing element returns to step 402 of the flow chart of FIG. 9.

If encrypted data is detected at step 426, the content processing element requests rescheduling of the stream queue to a decryption engine, such as an SSL engine, at step 428.

The particular scenario being depicted within FIG. 7 is consistent with the content processing element detecting a URL within the data stream at step 410 and proceeding through steps 412,414 and 416 of FIG. 9. Therefore, as depicted in FIG. 7, the result of the content processing element 80 detecting a URL within the data stream is the sending of a request for rescheduling of the stream queue SQ2 to the I/O element 60 and an indication for a pop to be initiated to the I/O element 60, as indicated by the signal 708 between the content processing element 80 and the stream queue controller 72. The result of this request is the stream queue controller changing the consumer attributes associated with the stream queue SQ2 such that the consumer rights belong to the I/O element 60. In this particular case, the producer and consumer of the stream queue SQ2 are both the I/O element 60, though it should be understood that the content processing element could have requested the rescheduling of the stream queue to another I/O element. Next, the stream queue controller 72 initiates a pop of data from the stream queue SQ2 to the new consumer, I/O element 60 as indicated by signal 710, and the I/O element 60 consumes the data within the stream queue SQ2.

Figure 10:
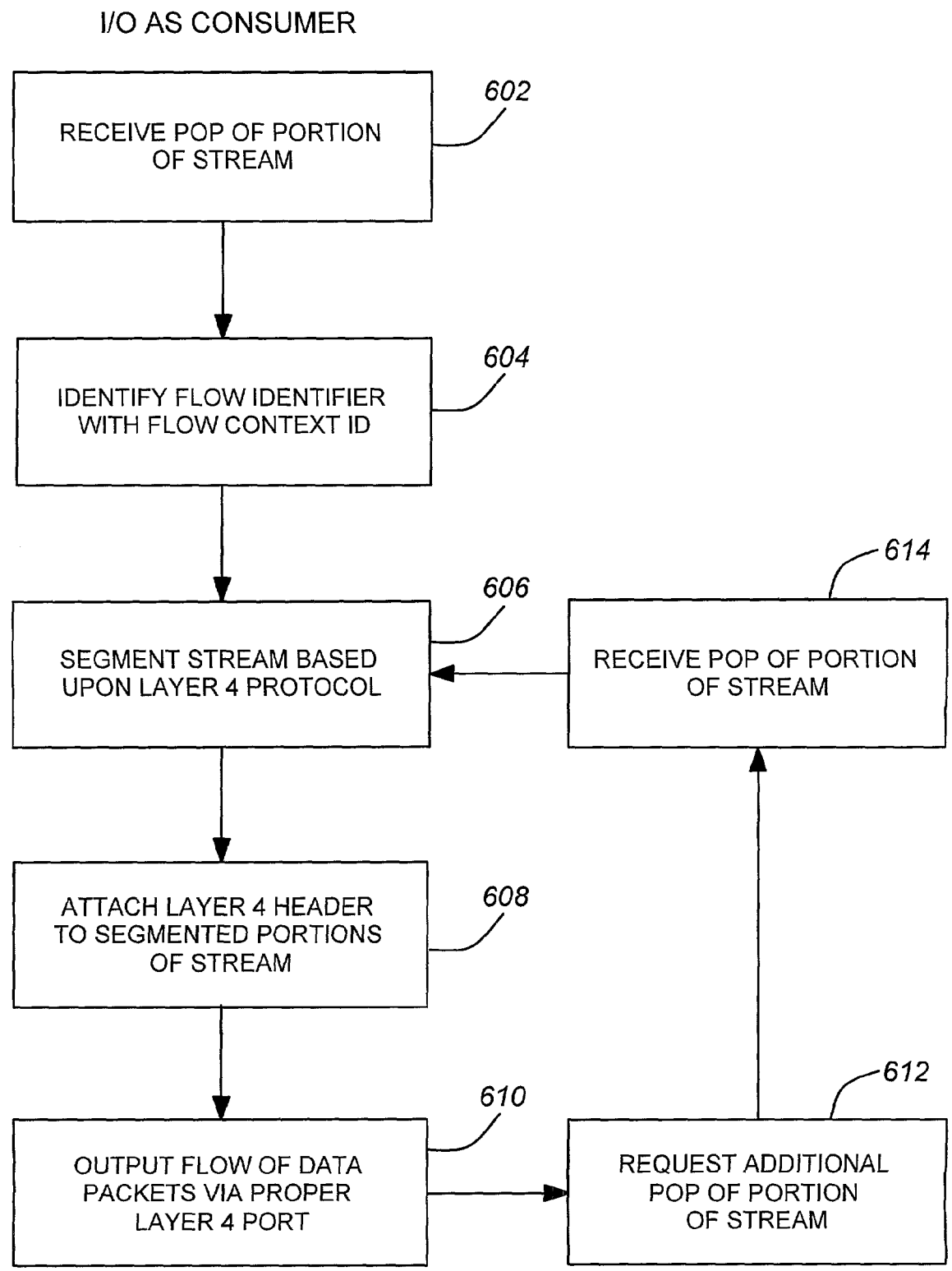
FIG. 10 illustrates a flow chart of a set of steps performed by an I/O element as a consumer for a stream queue according to an embodiment of the present invention.

FIG. 10 illustrates a flow chart of a set of steps performed by an I/O element as a consumer of a data stream according to an embodiment of the present invention. Initially, the I/O element receives a pop of a portion of a stream from a stream queue at step 602 and analyses the flow context ID provided by the content processing element to identify a flow identifier for the particular stream at step 604. If the flow context ID is simply an assigned number for a particular flow, the I/O element looks up the flow identifier from a flow identifier table. If the flow context ID includes a layer 3 destination address and layer 4 destination port, the I/O element generates a new flow identifier with this information along with known information with respect to the layer 4 ports that are available within the I/O element.

Next, the I/O element segments the stream based upon a layer 4 protocol at step 606, attaches layer 3 and layer 4 headers to the segmented portions of the stream at step 608, and outputs, at step 610, flows of data packets that correspond to the segmented portions of the data stream via the appropriate layer 4 port. At this point, the I/O element requests an additional pop of a portion of the data within the stream queue at step 612. After receiving the additional pop from the stream queue at step 614, the I/O element returns to step 606 within the procedure described above.

Within FIG. 7, the result of the I/O element consuming the data stream is the outputting of data packets 712 to the packet switched network.

Figure 11:
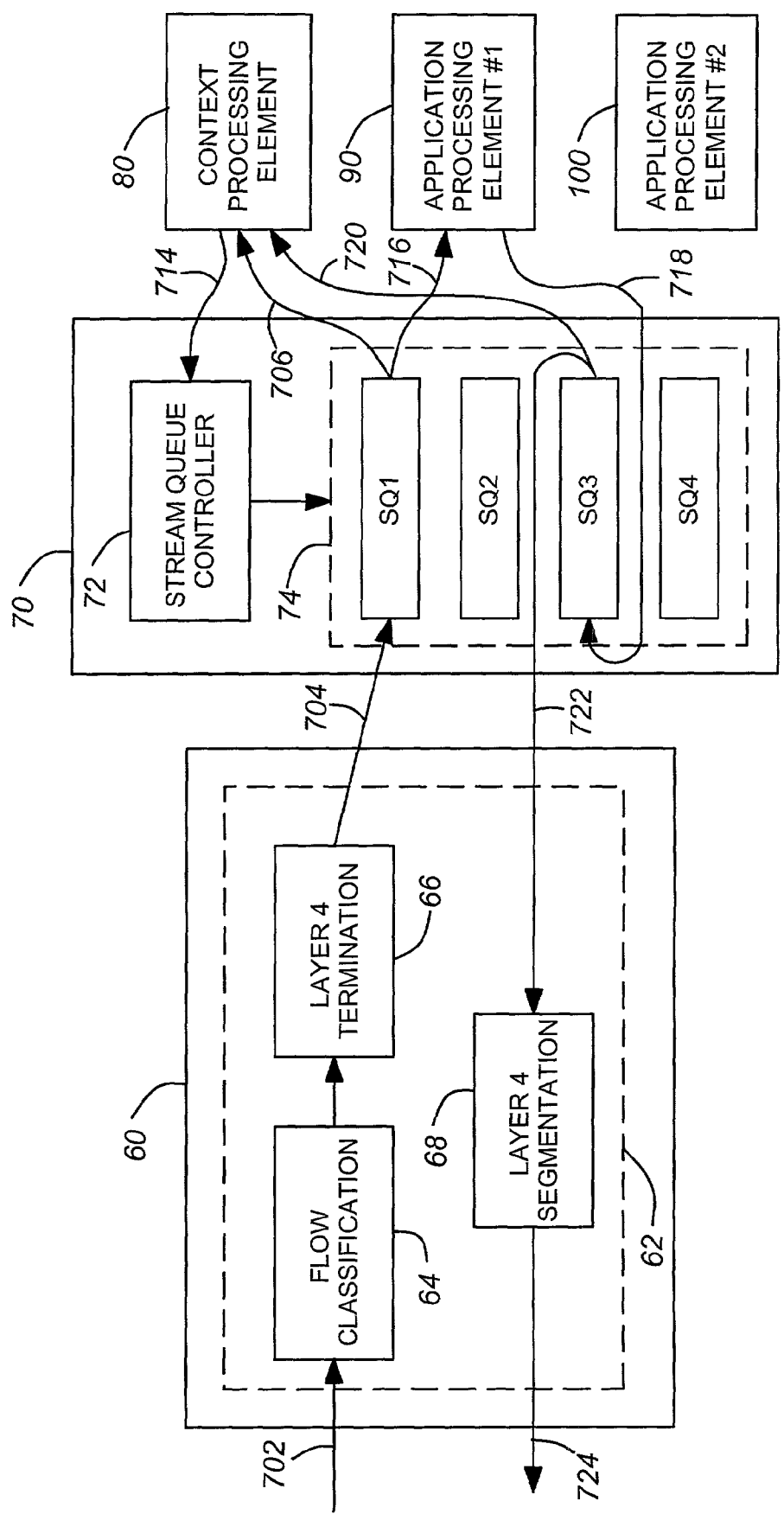
FIG. 11 illustrates the block diagram of FIG. 6 with the signalling depicted for another particular sample operation.

FIG. 11 illustrates the block diagram of FIG. 6 with the signalling depicted for a scenario in which encrypted data is detected within the data stream by the content processing element 80. In this case, the operation of the stream processing node 50 is identical to that described above for FIG. 7 until the content processing element has completed its analysis of the copied portion of the stream queue SQ2. In this case, the content processing element 80 determines that the data within the stream is encrypted and, as indicated by signal 714, requests rescheduling of the stream queue SQ2 to the first application processing element 90, which in this scenario has a decryption algorithm and therefore is a decryption processing element. The stream queue controller 72 then modifies the consumer attributes for the stream queue SQ2 such that the consumer is set as the application processing element 90 and initiates a pop of data from the stream queue SQ2 to the processing element 90 as indicated by signal 716.

Figure 12:
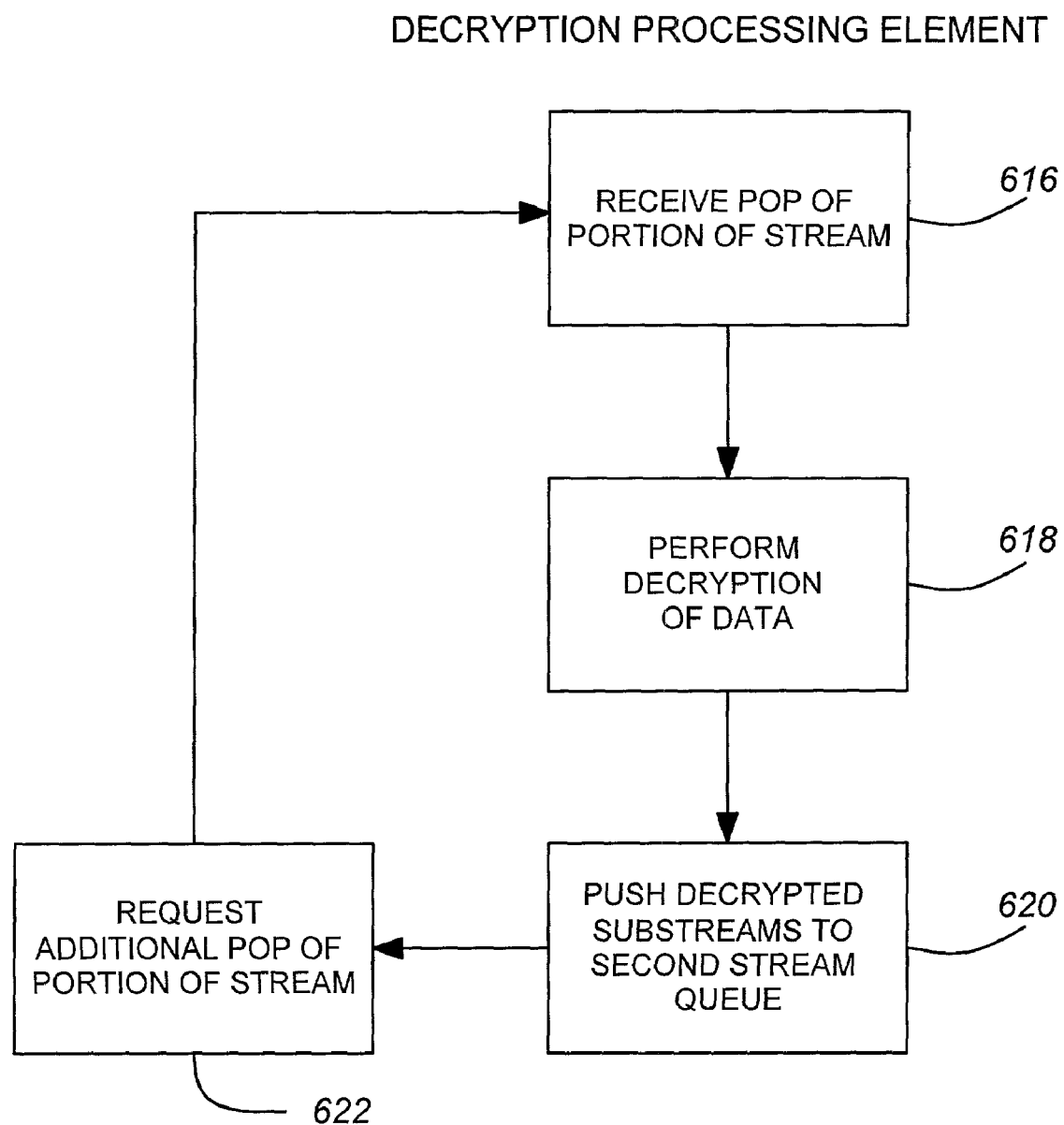
FIG. 12 illustrates a flow chart of a set of steps performed by a decryption processing element within a stream processing node according to the present invention.

FIG. 12 illustrates a flow chart of a set of steps performed by a decryption processing element within a stream processing node according to the present invention. Firstly, the decryption processing element receives a pop of a portion of the data within a stream queue at step 616. Next, the decryption processing element performs decryption procedures on this data at step 618 and pushes the decrypted substreams of a new data stream to a second stream queue within the stream fabric at step 620. Initially, the decryption processing element likely would need to initiate the second stream queue as indicated in the description of FIG. 1. Finally, the decryption processing element requests an additional pop of a portion of the data within the first stream queue at step 622 and then proceeds to return to step 616 described herein above.

Turning to FIG. 11, the application processing element 90, acting as a decryption processing element, receives portions of the data within stream queue SQ2 and outputs decrypted versions of the data stream into stream queue SQ3 as indicated by signal 718. In this scenario, the application processing element 90 initiated the stream queue SQ3 such that the initial consumer was chosen to be the content processing element 80. In this case, as described previously, a copy of the data within the stream queue SQ3 is copied to the content processing element 80 as indicated by signal 720. After analysing this data, the content processing element 80 then sends instructions to the stream queue controller by signal 714. In the scenario depicted in FIG. 11, the content processing element 80 determines the decrypted data stream includes a URL that should be used to properly route the data stream similar to the scenario of FIG. 7. This results in the rescheduling of the stream queue SQ3 to the I/O element 60, the popping of portions of the data within the stream queue SQ3 to the I/O element 60 as indicated by signal 722 and the eventual outputting of packets 724 corresponding to the decrypted data stream to the packet switched network.

It should be understood that in an alternative scenario, the content processing element 80, after determining the URL of the decrypted data stream, could have requested that the data within the stream queue SQ3 be re-encrypted prior to being rescheduled to the I/O element 60 for outputting. This could have been accomplished by rescheduling the stream queue SQ3 to an encryption processing element and initiating a third stream queue with the rights of the consumer and producer of this new stream queue being the I/O element 60 and the encryption processing element respectively. It should be understood that other techniques for re-encrypting the data stream could also be utilized.

Figure 13:
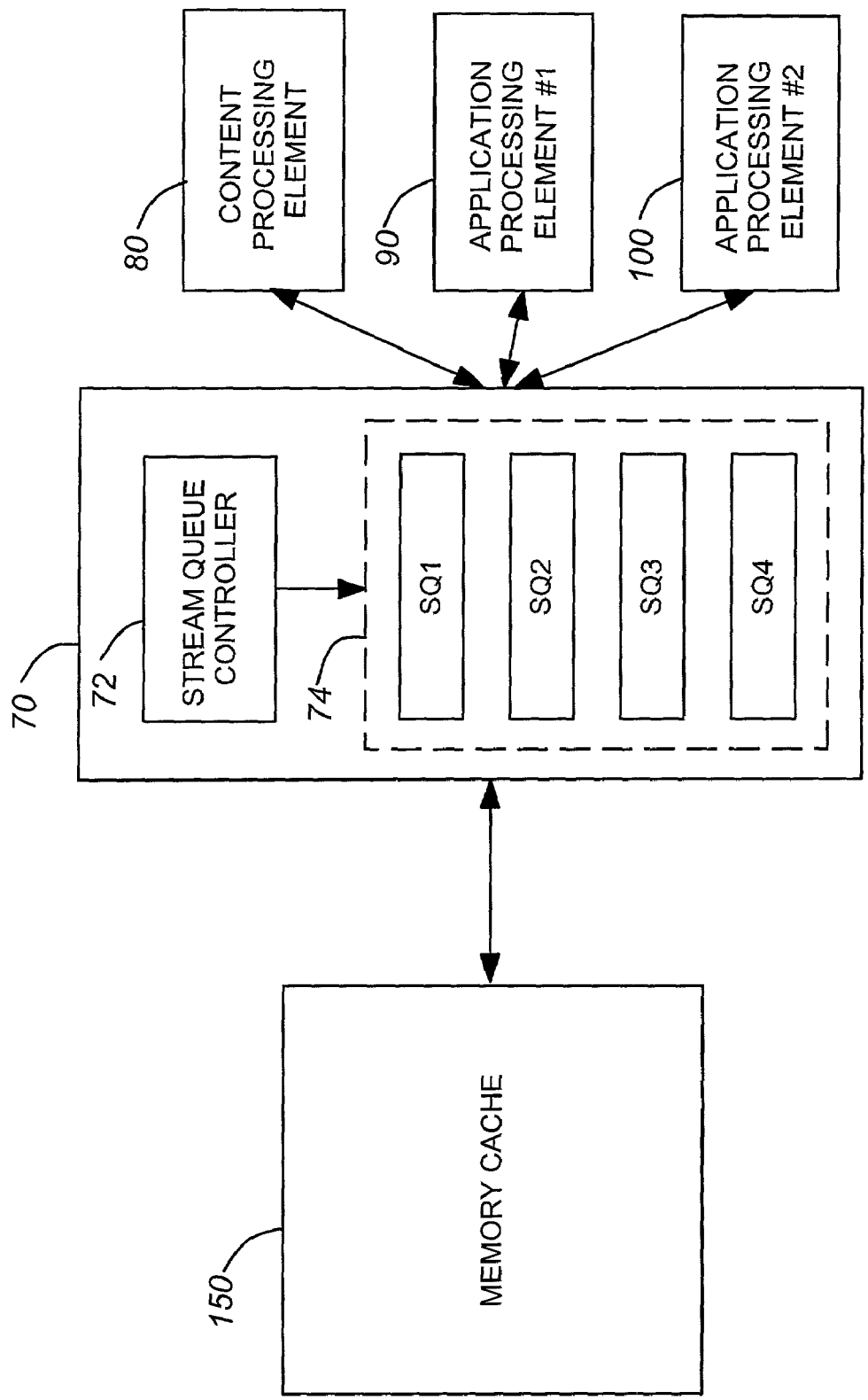
FIG. 13 illustrates a block diagram of an alternative stream processing node to that illustrated in FIG. 6.

Although the present invention is primarily described herein above for an implementation within a packet switched network, it should be understood that the scope of the present invention should not be limited to this implementation. It should be noted that the present invention could be used as the basis for switches, routers, bridges, servers, firewalls, load balancers, cache farms, etc. For instance, FIG. 13 illustrates a block diagram of an alternative stream processing node to that illustrated in FIG. 6 in which the I/O element 60 is replaced by a memory cache 150. In this case, the memory cache 150 could be utilized as a producer and/or a consumer for a stream queue within the stream fabric 70. It should be understood that a plurality of memory cache could be implemented in a stream processing node according to the present invention, possibly with no other processing elements but the content processing element 80.

It should be understood that embodiments of the stream processing node according to the present invention as described above could be implemented within one or more separate computer chips. For instance, in one implementation, an I/O element, a stream fabric and a plurality of processing elements are implemented on a single chip while in other implementations all of or at least a portion of the I/O element is implemented on a separate computer chip. Further implementations could also be possible.

Persons skilled in the art will appreciate that there are alternative implementations and modifications of the present invention, and that the above described implementation is only an illustration of specific embodiments of the invention. Therefore, the scope of the invention should only be limited by the claims appended hereto.

We claim:

1. An apparatus for processing data streams comprising:
    at least one producer of properly ordered substreams of a data stream;
    a plurality of potential consumers of a data stream; and
    a stream fabric, coupled to the producer and the potential consumers, that operates to receive the substreams from the producer, store each substream within a stream queue associated with each data stream and select one of said plurality of potential consumers and output at least a portion of the data within the stream queue to the selected consumer;
    wherein the stream fabric further operates to receive a control signal associated with the stream queue from the consumer of the stream queue;
    wherein the control signal comprises an indication of at least one consumer attribute for the stream queue; and wherein the consumer attribute comprises the number of bytes of the data within the stream queue that are to be output to the consumer of the stream queue.

2. An apparatus according to claim 1, wherein the stream fabric operates to select a consumer of the stream queue by reading a consumer attribute for the stream queue.

3. An apparatus according to claim 1, wherein the stream fabric operates to select one of the potential consumers as a consumer for the stream queue based upon a predetermined criteria.

4. An apparatus according to claim 3, wherein the predetermined criteria comprises a round robin system.

5. An apparatus according to claim 3, wherein the predetermined criteria comprises a determination of a least burdened potential consumer.

6. An apparatus according to claim 1, wherein the consumer attribute comprises the potential consumer that is selected as the consumer of the stream queue.

7. An apparatus according to claim 1, wherein the control signal comprises an indication of at least one attribute associated with the producer of the stream queue.

8. An apparatus according to claim 1, wherein the control signal comprises an instruction to copy at least a portion of the data within the stream queue to the consumer of the stream queue.

9. An apparatus according to claim 1, wherein the control signal comprises an instruction to forward at least a portion of the data within the stream queue to the consumer of the stream queue and to subsequently delete the portion of the data within the stream queue.

10. An apparatus according to claim 1, wherein the control signal comprises an instruction to transfer at least a portion of the data within the stream queue to another stream queue within the stream fabric.

11. An apparatus according to claim 1, wherein the producer is an Input/Output (I/O) element arranged to be coupled to a packet switched network.

12. An apparatus according to claim 11, wherein the I/O element operates to receive a flow of data packets, each of the data packets representing at least one segmented portion of the data stream; to terminate the layer 4 protocol within the received data packets; and to output property ordered substreams of the data stream to the stream queue associated with the data stream.

13. An apparatus according to claim 12, wherein the I/O element operating to terminate the layer 4 protocol within the received data packets comprises removing the packet overhead from the received data packets, reordering the data within the received data packets into the proper order if necessary and requesting retransmission of any lost packets if necessary.

14. An apparatus according to claim 1, wherein at least one of the said plurality of potential consumers is a processing element.

15. An apparatus according to claim 14, wherein the consumer of the stream queue is a content processing element that operates to receive the data output from the stream queue, process contents of the data received from the stream queue and transmit at least one control signal to the stream fabric in response to the processing of the contents of the data.

16. An apparatus according to claim 15, wherein the at least one control signal comprises an instruction to change a consumer attribute of the stream queue such that the consumer of the stream queue is changed to another one of the potential consumers.

17. An apparatus according to claim 16, wherein the other one of the potential consumers comprises an application processing element that operates to process the contents of the data received from the stream queue.

18. An apparatus according to claim 17, wherein the application processing element comprises an decryption processing element that operates to decrypt the data received from the stream queue and output the decrypted data to a second stream queue within the stream fabric.

19. An apparatus according to claim 16, wherein the other one of the potential consumers comprises an Input/Output (I/O) element coupled to a packet switched network, the I/O element operating to output the data within the stream queue to the packet switched network.

20. An apparatus according to claim 19, wherein, prior to the content processing element operating to transmit the control signal to the stream fabric, the content processing element further operates to add a flow context identifier to the stream queue associated with the data stream, the flow context identifier being used by the I/O element to select a flow within the packet switched network to output the data within the stream queue on.

21. An apparatus according to claim 15, wherein the stream fabric comprises a plurality of stream queues and the content processing element is set as a default initial consumer of each of the stream queues within the stream fabric.

22. An apparatus according to claim 1, wherein the producer and one of the potential consumers are the same component.

23. An apparatus for processing streams of data comprising:
at least one producer of properly ordered substreams of a data stream;
a content processing element; and
a stream fabric, coupled to the producer and the content processing element, that operates to receive the substreams from the producer, store the substreams within a stream queue associated with the data stream and copy at least a portion of the data within the stream queue to the content processing element;
wherein the content processing element operates to receive the data output from the stream queue, process contents of the data received from the stream queue and transmit at least one control signal to the stream fabric in response to the processing of the contents of the data.

24. An apparatus according to claim 23 further comprising at least one consumer of a data stream; and
wherein the at least one control signal comprises an instruction for the stream fabric to forward further data from the stream queue to the consumer.

25. An apparatus according to claim 24, wherein the consumer comprises an application processing element that operates to process the contents of the data received from the stream queue.

26. An apparatus according to claim 24, wherein the consumer comprises an Input/Output (I/O) element coupled to a packet switched network, the I/O element operating to output the data within the stream queue to the packet switched network.

27. A stream switch for directing, within a packet switched network, a data stream, the stream switch comprising:
an interface, arranged to be coupled to the packet switched network, that operates to receive and process a flow of data packets from the packet switched network, each of the data packets representing at least one segmented portion of the data stream, and to output properly ordered substreams of the data stream;

a stream fabric that operates to receive the substreams from the interface and store the substreams within a stream queue associated with the data stream; and a content processing element that operates to receive a copy of at least a portion of the data within the stream queue, process contents of the data received from the stream queue and instruct the stream fabric to direct the data within the stream queue to a selected flow of packets within the packet switched network, via the interface, in response to the processing of the contents of the data.

28. A method of processing a data stream comprising:
producing properly ordered substreams of a data stream;
storing each substream within a stream queue associated with each data stream within a switch fabric; and
outputting at least a portion of the data within the stream queue to a consumer of the stream queue, the consumer being one of a plurality of potential consumers;
wherein the producing properly order substreams of a data stream comprises receiving a flow of data packets, each of the data packets representing at least one segmented portion of the data stream; and terminating the layer 4 protocol within the received data packets.

29. A method according to claim 28, wherein the terminating the layer 4 protocol within the received data packets comprises removing the packet overhead from the received data packets, reordering the data within the received data packets into th proper order if necessary and requesting retransmission of any lost packets if necessary.

30. A method according to claim 28, wherein the outputting at least a portion of the data within the stream queue to a consumer of the stream queue comprises processing contents of at least a portion of the data within the stream queue, determining which of the potential consumers to select as the consumer for the stream queue based upon the contents of the at least a portion of the data within the stream queue and outputting at least a portion of the data within the stream queue to the selected consumer.

31. A method according to claim 30 further comprising processing the data received from the stream queue at the selected consumer of the stream queue.

32. A method according to claim 31, wherein the processing the data received from the stream queue comprises decrypting the data received from the stream queue and storing the decrypted data within a second stream queue.

33. A method according to claim 31, wherein the processing the data received from the stream queue comprises outputting the data received from the stream queue to a packet switched network.

* * * * *